3,020,238
PROCESS OF MANUFACTURING A SPECIAL GLASS APPLICABLE FOR MAKING A RADIO-PHOTOLUMINESCENCE DOSIMETER
Motosuke Munakata, Setagaya-ku, Tokyo-to, and Junpei Asahara, Shinjuku, Tokyo-to, Japan, assignors to Agency of Industrial Science and Technology, Ministry of International Trade and Industry, Tokyo-to, Japan
No Drawing. Filed Dec. 10, 1958, Ser. No. 779,274
Claims priority, application Japan Dec. 27, 1957
9 Claims. (Cl. 252—301.6)

This invention relates to a process of manufacturing a special glass applicable for making a radiophotoluminescence dosimeter which is used for measuring the amount of a radiation of high energy such as X rays, γ rays and electron rays.

For the simple measurement of the amount of any radiation, a dosimeter utilizing a glass has been recently adopted in addition to the film batch and pocket type ionization chamber. Particularly, the dosimeter made of phosphate glass containing reducible mono-valent metallic ions such as silver ions has been used as a simple dosimeter. In this dosimeter the phosphate glass is converted by radiation of any ionizing rays of high energy to a fluorescent substance which produces fluorescence when it is radiated with ultra-violet light, and the intensity of said fluorescence is in proportion to the doses. This dosimeter is very stable and can indicate the amount of radiation quickly in comparison with the film batch system, but it has the serious disadvantage that the radiation sensitivity is very low. For instance, the minimum detective limit and sensitivity of the transparent glass consisting of $P_2O_5$ of 64.9%, $Al_2O_3$ of 8.9%, BaO of 12.0%, $K_2O$ of 9.3%, and $Ag_2O$ of 5.0% by wt. percent are, respectively, about 20 roentgens and 0.8 scale, in which the sensitivity is expressed in the arbitrary scale in proportion to the fluorescent intensity of the glass produced when any radiation of 100 roentgens of X rays at 20 kv. (effective) is radiated over said glass. The sensitivity of such transparent glass is much lower than that of the film batch system.

The above-mentioned low sensitivity of the general glasses applied in the conventional dosimeter of fluorescent glass type is due to insufficient reaction of the ionizing rays with the silver ions in the glass, that is, due to inefficient occurrence of the reaction $(Ag^+ + e \rightarrow Ag)$ of atomic silver production. Accordingly, it has been desired to obtain a glass of high sensitivity, but it has not been obtained prior to this invention.

Therefore, the essential object of this invention is to provide a special glass which is much higher in sensitivity and is much lower in minimum detecting limit for the amount of the radiation than conventional transparent glasses.

Said objects and other objects of this invention have been attained by selecting the ratio of the amounts of the constituents of the glass within such percentages as to make the glass unstable so as to be devitrified, thus causing the easy reduction of the silver in the glass by the ionizing rays.

By the above-mentioned process, all the constituents of the glass are uniformly melted, but fine crystals are deposited at the liquidus temperature instantaneously and the melt is solidified by cooling. On the other hand, it is possible to obtain a glass having the composition which gives a glass with the property of being easily devitrified by maintaining the glass melt for some time interval at the temperature range necessary for the crystalization. In the latter case, the mixture of the constituents can be selected so that at a high temperature, the glass melt may contain some infused substances which remain during the cooling period in the suspending state and thus an opaque glass may be obtained.

EXAMPLE 1

This example relates to glasses having the compositions shown in Table 1. The mixture of the constituents was fused at 1300° C. to make fine crystals deposit instantaneously. For this purpose, the mixture of the constituents was first thoroughly stirred at 1300° C. for 20 minutes and then poured into a die. This die was immediately transferred into a cooling furnace maintained at 450° C. The dimension of the glass manufactured in this example is as follows:

| | Mm. |
|---|---|
| Longitudinal length | 17 |
| Transversal length | 17 |
| Thickness | 2.5 |

The radiophotoluminescence intensity of the products was measured with a conventional apparatus for measuring fluorescence. There were some differences among the radiation dosage sensitivities depending upon the glass composition, but they were about 12 scales and their minimum detecting limits were about 3 roentgens.

Table 1
[By weight percentage]

| No. | $P_2O_5$ | $Al_2O_3$ | BaO | MgO | CaO | SrO | ZnO | $K_2O$ | $Na_2O$ | $Ag_2O$ Weight (g.) per 100 g. of glass Produced |
|---|---|---|---|---|---|---|---|---|---|---|
| 1 | 66.7 | 12.0 | 6.0 | | | | | 14.8 | | 4.5 |
| 2 | 69.7 | 12.5 | | 1.7 | | | | 15.4 | | 4.5 |
| 3 | 66.8 | 12.0 | | | 2.2 | | | 14.8 | | 4.5 |
| 4 | 68.0 | 12.2 | | | | 4.1 | | 15.1 | | 4.5 |
| 5 | 68.7 | 12.3 | | | | | 3.3 | 15.2 | | 4.5 |
| 6 | 70.4 | 12.6 | 6.3 | | | | | | 10.6 | 4.5 |
| 7 | 73.8 | 13.4 | | 1.8 | | | | | 11.1 | 4.5 |
| 8 | 73.2 | 13.2 | | | 2.4 | | | | 11.0 | 4.5 |
| 9 | 72.0 | 12.9 | | | | 4.4 | | | 10.8 | 4.5 |
| 10 | 72.3 | 13.0 | | | | | 3.5 | | 10.9 | 4.5 |

EXAMPLE 2

The glasses in this example relate to the cases in which the amount of alkaline constituent is less than that in Example 1. Such glasses can be completely melted at 1300° C. In the same manner as in Example 1, the mixture having the composition as shown in Table 2 was thoroughly stirred at 1300° C. for 20 minutes in a crucible. This crucible was maintained for five minutes in a cooling furnace maintained at a temperature between 900° C. and 800° C. to devitrify the melt. This devitrified melt was put in a die and then put in a cooling furnace maintained at 450° C.

The radiation dosage sensitivities were about 5 scales and their minimum detecting limits were about 6 roentgens.

Table 2

[By weight percentage]

| No. | $P_2O_5$ | $Al_2O_3$ | BaO | MgO | CaO | SrO | ZnO | $K_2O$ | $Na_2O$ | $Ag_2O$ Weight (g.) per 100 g. of glass Produced |
|---|---|---|---|---|---|---|---|---|---|---|
| 1 | 64.0 | 11.5 | 17.3 | | | | | 7.08 | | 4.5 |
| 2 | 73.4 | 13.2 | | 5.3 | | | | 8.1 | | 4.5 |
| 3 | 72.0 | 12.9 | | | 7.1 | | | 7.9 | | 4.5 |
| 4 | 67.8 | 12.2 | | | | 12.4 | | 7.5 | | 4.5 |
| 5 | 69.7 | 12.5 | | | | | 10.0 | 7.7 | | 4.5 |
| 6 | 65.6 | 11.8 | 17.7 | | | | | | 4.9 | 4.5 |
| 7 | 75.3 | 13.5 | | 5.4 | | | | | 5.7 | 4.5 |
| 8 | 73.8 | 13.2 | | | 7.3 | | | | 5.5 | 4.5 |
| 9 | 69.5 | 12.5 | | | | 12.7 | | | 5.2 | 4.5 |
| 10 | 71.5 | 12.9 | | | | | 10.3 | | 5.4 | 4.5 |

EXAMPLE 3

This example relates to the case in which the base composition makes the glassy state stable. In this example, the mixture having the composition shown in Table 3 was thoroughly stirred at 1300° C. for 20 minutes and then poured into a die. This die was transferred into a cooling furnace maintained at 450° C. to cool the product slowly. This product contained infusible $Al_2O_3$ and SiO and then assumed a white milky appearance. The radiation dosage sensitivities were about 8 scales and their minimum detecting limits were about 6 roentgens.

Table 3

[By weight percentage]

| No. | $P_2O_5$ | $Al_2O_3$ | BaO | MgO | CaO | SrO | ZnO | $K_2O$ | $Na_2O$ | $SiO_2$ or $Al_2O_3$* wt. (g.) per 100 g. of base glass | $Ag_2O$ Weight (g.) per 100 g. of glass Produced |
|---|---|---|---|---|---|---|---|---|---|---|---|
| 1 | 65.7 | 7.9 | 11.8 | | | | | 14.5 | | 20 | 4.5 |
| 2 | 71.9 | 8.6 | | 3.5 | | | | 15.9 | | 20 | 4.5 |
| 3 | 71.1 | 8.5 | | | 4.7 | | | 15.7 | | 20 | 4.5 |
| 4 | 68.4 | 8.2 | | | | 8.3 | | 15.1 | | 20 | 4.5 |
| 5 | 69.5 | 8.3 | | | | | 6.1 | 15.4 | | 20 | 4.5 |
| 6 | 68.9 | 8.3 | 12.4 | | | | | | 10.4 | 20 | 4.5 |
| 7 | 75.8 | 9.1 | | 3.6 | | | | | 11.4 | 20 | 4.5 |
| 8 | 74.7 | 8.9 | | | 4.9 | | | | 11.2 | 20 | 4.5 |
| 9 | 71.8 | 8.6 | | | | 8.7 | | | 10.8 | 20 | 4.5 |
| 10 | 73.2 | 8.7 | | | | | 7.0 | | 11.0 | 20 | 4.5 |

*Note.—Diameter of the particle ($SiO_2$ or $Al_2O_3$) is below 20μ.

As will be clearly understood from Examples 1, 2 and 3, according to this invention, it has become possible to obtain a glass having a sensitivity for radiation dosage which is 5–15 times higher than that of conventional glass, and having a minimum detecting limit within the range of 3–6 roentgens.

While we have described particular embodiments of our invention, it will, of course, be understood that we do not wish our invention to be limited thereto, since many modifications may be made, and we, therefore, contemplate by the appended claims to cover all such modifications as fall within the true spirit and scope of our invention.

What we claim is:

1. An opaque solid body comprising glassy base material and fine crystalline particles contained therein, the amount of said particles being at least 15% by weight of the material, said particles being uniformly dispersed in the glassy base material and having a maximum diameter of about 50μ, said body being produced by forming a mixture of components effective to form phosphate glass, heating said mixture at a temperature from 1100° to 1350° C. to fuse said mixture and to cause crystals to deposit, and then cooling the fused mass to form an opaque solid body, said opaque solid body containing 64 to 75.3 weight percent of $P_2O_5$, 7.9 to 13.4 weight percent of $Al_2O_3$ and about 4 to 6 weight percent of $Ag_2O$.

2. A process of manufacturing a radiophotoluminescent glass which comprises the steps of mixing together $P_2O_5$, $Al_2O_3$, a metal compound selected from the group consisting of BaO, MgO, CaO, SrO and ZnO, an alkali metal compound selected from the group consisting of $K_2O$ and $Na_2O$ and $Ag_2O$, said $Ag_2O$ being present in the amount of 4 to 6 percent of the total weight of the mixture, and said $P_2O_5$ and said $Al_2O_3$ being present in the proportions to provide in said glass 64 to 75.3 weight percent of $P_2O_5$ and 7.9 to 13.5 weight percent of $Al_2O_3$, heating said mixture at a temperature from 1100° C. to 1350° C. to melt said mixture and to form microcrystals uniformly dispersed in the melted mass, each of said particles having a maximum diameter of 50μ and the quantity of said particles being at least about 15 weight percent of the product, and cooling and solidifying said melted mass, whereby to form an opaque body.

3. A process of manufacturing a radiophotoluminescent glass which comprises the stps of mixing together $P_2O_5$, $Al_2O_3$, a metal compound selected from the group consisting of BaO, MgO, CaO, SrO and ZnO, an alkali metal compound selected from the group consisting of $K_2O$ and $Na_2O$, and $Ag_2O$, said $Ag_2O$ being present in the amount of 4 to 6 perecent of the total weight of the mixture, and said $P_2O_5$, said $Al_2O_3$, said metal compound, and said alkali metal compound being present in the proportions to provide in said glass 64 to 75.3 weight percent of $P_2O_5$, 7.9 to 13.5 weight percent of $Al_2O_3$, 1.7 to 17.7 weight percent of said metal compound and 5.2 to 15.9 weight percent of said alkali metal compound, heating said mixture at a temperature from 1100° C. to 1350° C. to melt said mixture and to form microcrystals uniformly dispersed in the melted mass, each of said particles having a maximum diameter of 50μ and the quantity of said particles being at least about 15 weight percent of the product, and cooling and solidifying said melted mass, whereby to form an opaque body.

4. An opaque solid body comprising glassy base material and fine crystalline particles contained therein, the amount of said particles being at least 15% by weight of the material, said particles being uniformly dispersed in the glassy base material and having a maximum diameter of about 50μ, said body being produced by mixing together $P_2O_5$, $Al_2O_3$, a metal compound selected from the group consisting of BaO, MgO, CaO, SrO and ZnO, an alkali metal compound selected from the group consisting of $K_2O$ and $Na_2O$, and $Ag_2O$, said $Ag_2O$ being present in the amount of 4 to 6 percent of the total weight of the mixture, and said $P_2O_5$ and said $Al_2O_3$ being present in the proportions to provide in said glass 64 to 75.3 weight percent of $P_2O_5$ and 7.9 to 13.5 weight percent of $Al_2O_3$, heating said mixture at a temperature from 1100° C. to 1350° C. to melt said mixture and to form microcrystals uniformly dispersed in the melted mass, each of said particles having a maximum diameter of 50μ and the quantity of said particles being at least about 15 weight percent of the product, and cooling and solidifying said melted mass, whereby to form an opaque body.

5. An opaque solid body comprising glassy base material and fine crystalline particles contained therein, the amount of said particles being at least 15% by weight of the material, said particles being uniformly dispersed in the glassy base material and having a maximum diameter of about 50μ, said body being produced by mixing together $P_2O_5$, $Al_2O_3$, a metal compound selected from the group consisting of BaO, MgO, CaO, SrO and ZnO, an alkali metal compound selected from the group consisting of $K_2O$ and $Na_2O$, and $Ag_2O$, said $Ag_2O$ being present in the amount of 4 to 6 percent of the total weight of the mixture, and said $P_2O_5$, said $Al_2O_3$, said metal compound, and said alkali metal compound being present in the proportions to provide in said glass 64 to 75.3 weight percent of $P_2O_5$, 7.9 to 13.5 weight percent of $Al_2O_3$, 1.7 to 17.7 weight percent of said metal compound and 5.2 to 15.9 weight percent of said alkali metal compound, heating said mixture at a temperature from 1100° C. to 1350° C. to melt said mixture and to form microcrystals uniformly dispersed in the melted mass, each of said particles having a maximum diameter of 50μ and the quantity of said particles being at least about 15 weight percent of the product, and cooling and solidifying said melted mass, whereby to form an opaque body.

6. An opaque solid body comprising glassy base material and fine crystalline particles contained therein, the amount of said particles being at least 15% by weight of the material, said particles being uniformly dispersed in the glassy base material and having a maximum diameter of about 50μ, said body being produced by mixing together $P_2O_5$, $Al_2O_3$, a metal compound selected from the group consisting of BaO, MgO, CaO, SrO and ZnO, an alkali metal compound selected from the group consisting of $K_2O$ and $Na_2O$, and $Ag_2O$, said $Ag_2O$ being present in the amount of 4 to 6 percent of the total weight of the mixture, and said $P_2O_5$, said $Al_2O_3$, said metal compound and said alkali metal compound being present in the proportions to provide in said glass 64 to 75.3 weight percent of $P_2O_5$, 12 to 13.5 weight percent of $Al_2O_3$, 1.7 to 6.3 weight percent of said metal compound, and 10.6 to 15.4 weight percent of said alkali metal compound, heating said mixture at a temperature from 1100° C. to 1350° C. to melt said mixture and to form microcrystals uniformly dispersed in the melted mass, each of said particles having a maximum diameter of 50μ and the quantity of said particles being at least about 15 weight percent of the product, and cooling and solidifying said melted mass, whereby to form an opaque body.

7. An opaque solid body comprising glassy base material and fine crystalline particles contained therein, the amount of said particles being at least 15% by weight of the material, said particles being uniformly dispersed in the glassy base material and having a maximum diameter of about 50μ, said body being produced by mixing together $P_2O_5$, $Al_2O_3$, a metal compound selected from the group consisting of BaO, MgO, CaO, SrO and ZnO, an alkali metal compound selected from the group consisting of $K_2O$ and $Na_2O$, and $Ag_2O$, said $Ag_2O$ being present in the amount of 4 to 6 percent of the total weight of the mixture, and said $P_2O_5$, said $Al_2O_3$, said metal compound and said alkali metal compound being present in the proportions to provide in said glass 64 to 75.3 weight percent of $P_2O_5$, 11.5 to 13.5 weight percent of $Al_2O_3$, 5.3 to 17.7 weight percent of said metal compound, and 4.9 to 8.1 weight percent of said alkali compound, heating said mixture at a temperature from 1100° C. to 1350° C. to melt said mixture and to form microcrystals uniformly dispersed in the melted mass, each of said particles having a maximum diameter of 50μ and the quantity of said particles being at least about 15 weight percent of the product, and cooling and solidifying said melted mass, whereby to form an opaque body.

8. An opaque solid body comprising glassy base material and fine crystalline particles contained therein, the amount of said particles being at least 15% by weight of the material, said particles being uniformly dispersed in the glassy base material and having a maximum diameter of about 50μ, said body being produced by mixing together $P_2O_5$, $Al_2O_3$, a metal compound selected from the group consisting of BaO, MgO, CaO, SrO and ZnO, an alkali metal compound selected from the group consisting of $K_2O$ and $Na_2O$, and $Ag_2O$, said $Ag_2O$ being present in the amount of 4 to 6 percent of the total weight of the mixture, and said $P_2O_5$, said $Al_2O_3$, said metal compound and said alkali metal compound being present in the proportions to provide in said glass 64 to 75.3 weight percent of $P_2O_5$, 7.9 to 13.4 weight percent of $Al_2O_3$, 3.5 to 12.4 weight percent of said metal compound, and 10.4 to 15.9 weight percent of said alkali compound, heating said mixture at a temperature from 1100° C. to 1350° C. to melt said mixture and to form microcrystals uniformly dispersed in the melted mass, each of said particles having a maximum diameter of 50μ and the quantity of said particles being at least about 15 weight percent of the product, and cooling and solidifying said melted mass, whereby to form an opaque body.

9. A process of manufacturing a radiophotoluminescent glass which comprises the steps of mixing together $P_2O_5$, $Al_2O_3$, a metal compound selected from the group consisting of BaO, MgO, CaO, SrO and ZnO, an alkali metal compound selected from the group consisting of $K_2O$ and $Na_2O$, and $Ag_2O$, said $Ag_2O$ being present in the amount of 4 to 6 percent of the total weight of the mixture, and said $P_2O_5$, said $Al_2O_3$, said metal compound and said alkali metal compound being present in the proportions to provide in said glass 50 to 70 mol percent of $P_2O_5$, 10 to 20 mol percent of $Al_2O_3$, 1.7 to 17.7 weight percent of said metal compound and 5.2 to 15.9 weight percent of said alkali metal compound, heating said mixture at a temperature from 1100° C. to 1350° C. to melt said mixture and to form microcrystals uniformly dispersed in the melted mass, each of said particles having a maximum diameter of 50μ and the quantity of said particles being at least about 15 weight percent of the product, and cooling and solidifying said melted mass, whereby to form an opaque body.

References Cited in the file of this patent

UNITED STATES PATENTS

| | | |
|---|---|---|
| 2,097,275 | Fischer | Oct. 26, 1937 |
| 2,270,124 | Huniger et al. | Jan. 13, 1942 |
| 2,730,625 | Shurcliff | Jan. 10, 1956 |

FOREIGN PATENTS

| | | |
|---|---|---|
| 460,210 | Great Britain | Jan. 22, 1937 |